ABSTRACT OF THE DISCLOSURE

Electroplated polymeric materials are produced by making a block copolymer or a mixture of block copolymers of at least one monovinyl-substituted aromatic compound and at least one conjugated diene, preplating the block copolymer or mixture of block copolymers electrolessly, and applying a final metallic finish by electroplating. The block copolymer or mixture of block copolymers is blended with polystyrene, a styrene/acrylonitrile-containing copolymer, or mixture of polystyrene and a styrene/acrylonitrile-containing copolymer and the blend is metal-plated like above.

---

This invention relates to electroplating polymeric compositions. In one aspect, this invention relates to a method for electroplating polymers of monovinyl-substituted aromatic compounds and the plated articles produced thereby.

The market for electroplated plastic articles has expanded tremendously in the last few years. By electroplating plastics, the inherent advantages of these materials, i.e., economy, light weight, moldability, etc., become available to the users of electroplated parts. Present applications for electroplated plastics include automotive accessories, appliance parts, plumbing fixtures, houseware and furniture parts, and industrial uses for the characteristics of its abrasion resistance qualities are desirable.

Acrylonitrile-butadiene-styrene copolymer, hereinafter referred to as ABS, is the plastic presently most widely used for electroplating. Although ABS is a high-performance plastic, other plastics are desirable either because they possess specific physical and chemical property advantages or because of lower cost of manufacture. Generally, it has been found that plating applied by conventional processes to many other plastics does not adhere readily thereto; therefore, they have seen limited use. Currently, the technique most widely used for plating plastics other than ABS is an encapsulation process. The plating deposited during encapsulation does not involve chemical adhesion; consequently, the plate maintains adhesion to the substrate only as long as the mechanical bond between the substrate and the metal stays intact. This disadvantage has substantially limited the use of electroplated articles made from plastics other than ABS to small objects such as knobs. For these reasons industry has been continuously striving to develop polymeric compounds which can be plated by electroplating techniques.

The ABS resins commonly used for electroplating contain 20 to 25 percent acrylonitrile, 20 to 35 percent butadiene and 40 to 55 percent styrene and are made by various methods including dry blending, latex blending, copolymerization, and graft polymerization. Generally, these processes are somewhat complex and result in a relatively expensive material. In addition, ABS has properties which are not necessary for many electroplated applications, e.g. extremely high resistance to chemicals which is not required of parts having a metal plate such as knobs, and has a relatively high heat distortion temperature which makes it more difficult to mold than other plastics. We have found that polymeric materials, which can be economically made, are easier to process than ABS, and are capable of being electroplated with good bond strength between the metal plate and the material, can be produced by forming a block copolymer of at least one monovinyl-substituted aromatic compound and at least one conjugated diene wherein the conjugated diene portion of the block polymer is at least 1.5 weight percent. We have also found that polystyrene and styrene-acrylonitrile resins containing less than 8 weight percent acrylonitrile, heretofore considered extremely difficult to electroplate with a reasonable bond strength, can be electroplated by conventional techniques with good bond strength when the above block copolymers are blended therewith.

Accordingly, it is an object of this invention to provide inexpensive electroplated polymeric articles.

Another object of this invention is to provide a simplified, inexpensive method for making electroplated polymeric articles.

Other objects, aspects and advantages of this invention will become apparent to those skilled in the art from the following discussion and appended claims.

According to this invention, there is provided a method for electroplating polymeric compositions which comprises forming at least one block copolymer of at least one monovinyl-substituted aromatic compound and at least one conjugated diene, the conjugated diene portion of the resulting block copolymer or block copolymers being in the range of 1.5 to 50, preferably 3 to 30, weight percent, based on the total weight of the block copolymer or block copolymers; preplating the material by electroless plating; and then electroplating a final metallic finish onto the preplated material.

Further according to this invention, block copolymers of the above type are blended with polystyrene, styrene-acrylonitrile copolymers containing less than 8 weight percent acrylonitrile based on the total weight of the acrylonitrile-containing copolymer, or mixtures thereof in sufficient amounts so that the conjugated diene portion in the resulting blend is in the range of 1.5 to 50 weight percent, the minimum amount of the block copolymer in the blend being at least 1.6 weight percent. The resulting blend is preplated by electroless plating and then a final metallic finish is electroplated onto the preplated blend.

Mixtures of resinous and rubbery blocy copolymers and mixtures of more than one resinous block copolymer, as well as a single resinous block copolymer, can be used as the only polymeric materials. When blended with polystyrene, the acrylonitrile-containing copolymers, or mixtures of polystyrene and the acrylonitrile-containing copolymers, a single resinous or rubbery block copolymer, mixtures of resinous block copolymers, mixtures of rubbery block copolymers, or mixtures of resinous and rubbery block copolymers can be used. The only essential requirement is that the conjugated diene portion of the composition be in the range of 1.5 to 50 weight percent based on the total weight of the composition and that the minimum amount of the block copolymer or mixture of block copolymers in the blend is at least 1.6 weight percent.

The block copolymers can be prepared by any of the well known methods. The block copolymers can be formed by solution polymerization techniques so that the block structure is characterized by the molecules of the vinyl polymer product being composed of contiguous blocks or segments of different polymeric types. For example, one of the blocks forming the polymer chain can be a homopolymer of a conjugated diene or a copolymer of a conjugated diene and a monovinyl-substituted aromatic compound while an adjacent block in that same chain can be a homopolymer of a monovinyl-substituted aromatic compound or a copolymer of a monovinyl-substituted aromatic compound and a conjugated diene. It should be noted that one or more conjugated diene or monovinyl-substituted aromatic copolymer blocks can be present in the block copolymer used in this invention.

When the block copolymer is rubbery, it contains from about 40 to 95, preferably from about 50 to 95, weight percent conjugated diene based on the total weight of the monomers employed to make the block copolymer and from about 5 to about 60, preferably from about 5 to about 50, weight percent monovinyl-substituted aromatic compound based upon the total weight of the monomer employed to make the block copolymer. The conjugated diene block of the rubbery block copolymer contains at least 50 weight percent conjugated diene based on the total weight of the conjugated diene block. The monovinyl-substituted aromatic block of the rubbery block copolymer is resinous and preferably a homopolymer of a monovinyl-substituted aromatic compound which can be a copolymer containing at least 80 weight percent monovinyl-substituted aromatic compound based on the total weight of the monovinyl-substituted aromatic block. The rubbery block copolymer contains from about 5 to about 75 weight percent of the monovinyl-substituted aromatic block based on the total weight of the rubbery block copolymer.

When the block copolymer is resinous it contains from about 50 to about 98, preferably from about 70 to about 90, weight percent monovinyl-substituted aromatic compound or compounds, with the remainder being conjugated dienes. The monovinyl-substituted aromatic block of the resinous block copolymer is preferably a homopolymer of a monovinyl-substituted aromatic compound but can be a copolymer of a monovinyl-substituted aromatic compound and a conjugated diene containing at least 90 weight percent monovinyl-substituted aromatic compound based upon the total weight of the monovinyl-substituted aromatic block. The conjugated diene block of the resinous block copolymer contains at least 50 weight percent conjugated diene based upon the weight of the conjugated diene block.

The conjugated dienes that can be used in preparing the copolymers applicable to this invention are those containing from 4 to 10 carbon atoms per molecule. Representative examples of these conjugated dienes are 1,3-butadiene, isoprene, 1,3-pentadiene (piperylene), 1,3-hexadiene, 2,3-dimethyl-1,3-butadiene, 1,3-octadiene, 4-ethyl-1,3-hexadiene, 1-phenyl-1,3-butadiene, and the like. The presently preferred conjugated dienes are butadiene, isoprene and piperylene.

Monovinyl-substituted aromatic compounds that can be employed for preparing the block copolymers of this invention are those containing from 8 to 12 carbon atoms per molecule. Representative examples of these compounds include styrene, 3-methylstyrene, 4-methylstyrene, 4-isopropylstyrene, 2,4-dimethylstyrene, 1-vinylnaphthalene, 2-vinylnaphthalene, and the like. Solution-polymerized copolymers having block distribution of the monomers in the copolymer chain can be formed by polymerizing a first monomer in the presence of an organolithium catalyst to form a homopolymer and subsequently adding a second monomer to the polymerization zone and continuing the polymerization operation. Block copolymers can also be formed by contacting a mixture of the selected conjugated diene and monovinyl-substituted aromatic compound with an organolithium catalyst in the presence of a hydrocarbon diluent selected from the group consisting of aromatic, paraffinic, and cycloparaffinic hydrocarbons. The polymerization is generally carried out at a temperature within the range of from about −5 to 300° F., preferably from about 15 to about 200° F., and at pressures sufficient to maintain the materials substantially in the liquid phase. The pressure employed will depend upon such things as the specific materials being polymerized, the diluents being used and the temperature at which the polymerization is carried out.

The organolithium compounds generally used correspond to the formula $R(Li)_x$ wherein R is a hydrocarbon radical selected from the group consisting of aliphatic, cycloaliphatic and aromatic radicals and combinations thereof and $x$ is an integer from 1 to 4, inclusive. The aliphatic and cycloaliphatic radicals can be saturated or can contain olefinic unsaturation. The R in the formula has a valence equal to the integer and preferably contains from 1 to 20 carbon atoms per molecule, inclusive, although it is within the scope of this invention to use higher molecular weight compounds. Representative examples of these compounds include methyllithium, isopropyllithium, n-butyllithium, tert-octyllithium, n-decyllithium, phenyllithium, 2-naphthyllithium, 4-phenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,4-dilithionaphthalene, 1,2-dilithio-1,2-diphenylethane, 9,10-dilithio - 9,10 - dihydroanthracene, 1,2-dilithio-1,3-diphenyloctane, 1,3,5-trilithiopentane, 1,5,15-trilithioeicosane, 1,3,5,8-tetralithiodecane, 1,5,10,20-tetralithioeicosane, 1,2,4,6 - tetralithiocyclohexane, 1,2,3,5-tetralithio-4-hexylanthracene, 1,3-dilithio-4-cyclohexene, and the like.

Catalysts other than the foregoing types of organolithium compounds can be used to prepare the polymers of this invention. For example, the catalysts disclosed in U.S. Patent 3,215,679, the disclosure of which is hereby incorporated by reference herein for the sake of completeness, can be used.

The amount of catalyst used in the preparation of block copolymers can vary over a wide range but will generally be 0.3 to 100 gram equivalents of lithium per 100 grams of the total monomers charged to the polymerization zone. The upper limit for the amount of organolithium compound used depends primarily upon the catalyst solubility and the desired inherent viscosity of the polymer resulting from the polymerization. A preferred effective catalyst level is from 0.6 to 15 gram milliequivalents of lithium per 100 grams of the total monomers charged to the polymerization zone.

The hydrocarbon diluent employed is preferably aromatic, paraffinic, or cycloparaffinic containing from 3 to 12 carbon atoms per molecule, inclusive. Representative examples of such diluents include propane, n-butane, isobutane, n-pentane, n-hexane, n-decane, n-dodecane, cyclohexane, cyclopentane, methylcyclohexane, benzene, toluene, xylene, and the like. Mixtures of two or more of these hydrocarbons can be employed.

Block polymers prepared by using an organomonolithium initiator can be treated with a polyfunctional agent to terminate the polymerization and couple together two or more block copolymers. Suitable methods for making block copolymers are disclosed in U.S. Patents 3,030,346 and 2,975,160.

At the completion of the above polymerization reaction, the reaction mixture is inactivated by the addition of one or more conventional catalyst-inactivating materials such as water, alcohols, organic and inorganic acids, and the like. Also, suitable additives such as antioxidants, stabilizers, and pigments and the like can be added to the copolymer product. Peroxy compounds, including organic and inorganic peroxides, can be added when the block copolymers are blended with polystyrene or the acrylonitrile-containing copolymers if desired to add high impact strength characteristics to the material.

The block copolymers can be mixed or blended with the polystyrene or acrylonitrile-containing copolymer in any conventional manner whereby an intimate mixture of the components is effected. When a peroxy compound is used the mixing is preferably carried out substantially in the absence of air in order to effect maximum property improvement; however, the exclusion of air is not essential. Generally, the mixing can be accomplished by any conventional mixing device such as a Banbury, twin-screw extruder, Brabender Plastograph, and the like. Mixing in a vacuum or inert atmosphere such as nitrogen, can also be advantageously employed in this invention. It should be noted that various techniques can be employed such as blending only a portion of one or more components, such as all the rubbery block copolymer and a portion of the polystyrene in the first mixing cycle and then adding the resinous block copolymer and the remainder of the polystyrene in a second mixing cycle. The blends of this invention can also contain other ingredients normally included in such compounds such as antioxidants, pigments, dyes, fillers, stabilizers, plasticizers, foaming agents, and the like.

The preplating step of this invention can be accomplished by any of the well known electroless plating techniques which generally include: cleaning the material with a solution, such as a sodium pyrophosphate solution; conditioning or etching the surface of the material with a strong acid solution, such as chromic-sulfuric acid, at elevated temperatures in the range of about 100 to about 160° F.; sensitizing the surface of the material with an oxidizable salt such as stannous chloride; activating the sensitized surface with a precious metal salt, such as palladium chloride; and electrolessly plating with either copper (about 0.005 mil to about 0.010 mil) or nickel (about 0.010 to about 0.030 mil). Each conditioning step is followed by one or more water rinses. The continuous film of electrically conductive material applied by the preplating process provides the capability for applying the final finish by conventional electrolytic processes. Following the preplate process, normal plating of copper-nickel-chrome, or nickel-chrome, or any of the whole variety of final finishes, including gold and silver, can be applied by conventional electroplating techniques. For most applications the final plate will be about 0.5 to 2.0 mils thick, but even thicker plate can be applied if desired for the particular application.

The following specific examples present data which illustrates and clarifies the invention but should not be interpreted to restrict or limit the invention unnecessarily.

EXAMPLE I

Six styrene/butadiene block copolymer samples were prepared in accordance with the following recipes:

| Sample No. | 1 | 2 | 3 | 4 | 5 | 6 |
| --- | --- | --- | --- | --- | --- | --- |
| Cyclohexane, g | 8,625 | 1,180 | 1,180 | 1,180 | 8,625 | 8,625 |
| Styrene, g | 1,800 | 245 | 214 | 202 | 1,504 | 1,410 |
| n-Butyllithium, g | 4.5 | 7.5 | 7.5 | 11.3 | 11.3 | 22.6 |
| Butadiene, g | 0 | 5 | 11 | 23 | 376 | 470 |
| Divinylbenzene, g | 0 | 0.08 | 0.145 | 0.24 | 3.8 | 4.7 |
| Stabilizing agent [1] | 0 | 1 | 1 | 1 | 2 | 2 |
| Styrene/butadiene ratio [2] | 100/0 | 98/2 | 95/5 | 90/10 | 80/20 | 75/25 |

[1] A mixture containing 2 parts by weight Geltrol (a mixture consisting of approximately 44 mol percent of an alkyl-substituted triphenyl phosphite and approximately 56 mol percent of an alkyl-substituted phenol) and 1 part by weight Ionol (2,6-di-tert-butyl-4-methylphenol).
[2] Control.

A major portion of the cyclohexane solvent was added to the reactor with the remaining portion being used to flush the various reactants into the reactor. Styrene was then added to the reactor followed by the addition of the n-butyllithium initiator. The styrene was allowed to react for about 30 minutes during which the temperature of the reactants initially rose from about 160° F. to about 220° F. and then decreased to about 180 to 190° F. Butadiene was then charged to the reactor and allowed to react for about 30 minutes during which time the temperature of the reactants increased to about 200° F. Divinylbenzene crosslinking agent was then charged to the reactor and allowed to react for 30 to 60 minutes during which time there was no appreciable temperature increase. The reaction mixture was dumped into excess isopropyl alcohol, drained, dried, and stabilized by the addition of the stabilizing agent. The various samples were compression molded into slabs 1 inch x 2½ inches x ⅛ inch and each slab was subjected to a somewhat conventional plating process under identical operating conditions. The following procedure was used:

(1) Immerse in a sodium pyrophosphate cleaning solution for 2 to 5 minutes at 140° F.
(2) Immerse in a sodium bisulfate neutralizing solution for 15 to 30 seconds at 75° F.
(3) Immerse in an acid chromate etching solution for 15 minutes at 130° F.
(4) Rinse with 5 weight percent hydrochloric acid.
(5) Immerse in a stannous chloride sensitizing solution for 15 to 60 seconds at 75° F.
(6) Immerse in a palladium ammonium chloride activating solution for 15 to 60 seconds at 75° F.
(7) Immerse in an electroless copper plating solution for 10 to 30 minutes at 75° F. The plating solution comprised modified Fehling solutions: solution A was $CuSO_4$ and solution B was NaOH, NaK tartrate, $Na_2CO_3$ and $NaC_2H_3O_2$.
(8) Strike with copper. The composition of the copper strike bath and conditions for plating were as follows:

Composition of the copper strike bath 98 grams $CuSO_4 \cdot 5H_2O$
15.5 milliliters concentrated $H_2SO_4$
1 milliliter UBAC Brightener No. 1 [1]
Sufficient water to make 1 liter of solution

[1] Supplied by Udylite Corporation, Detroit, Mich.

Plating conditions

Voltage—1 to 1½ volts D.C.
Current density—10 to 15 amperes/ft.²
Current efficiency—100%
Anode—electrolytic copper
Temperature—75 to 80° F.
Time—4 to 10 minutes
Mechanical stirring of bath (9) Electroplate with bright copper. The composition of the bright copper bath and conditions for plating were as follows:

Composition of the bright copper bath 212 grams $CuSO_4 \cdot 5H_2O$
28.8 milliliters concentrated $H_2SO_4$
4 milliliters UBAC Brightener No. 1
75 milligrams NaCl
Sufficient water to make 1 liter of solution Plating conditions Voltage—1½ to 2 volts D.C.
Current density—30 to 40 amperes/ft.²
Current efficiency—98 to 100%
Anode—electrolytic copper
Temperature—75 to 80° F.
Time—1 to 3 minutes
Air agitation of the bath

(10) Electroplate with nickel. The composition of the nickel plating bath and conditions for plating were as follows:

Composition of the nickel plating bath 1136 grams $NiSO_4 \cdot 6H_2O$
312 grams $NiCl_2$
185 grams boric acid
Sufficient water to make 1 gallon of solution Plating conditions Voltage—4 volts D.C.
Current density—40 to 50 amperes/ft.²
Current efficiency—95 to 100%
Anode—nickel
Temperature—75 to 80° F.
Time—30 to 120 seconds
Mechanical stirring of the bath

(11) Plate with chrome. The compositions of the chrome plating bath and the conditions for plating were as follows:

Composition of the chrome plating bath 350 grams $CrO_3$
2 milliliters concentrated $H_2SO_4$
Sufficient water to make 1 liter of solution Plating conditions Voltage—6 to 8 volts D.C.
Current density—90 to 110 amperes/ft.$^2$
Current efficiency—20%
Anode—lead
Temperature—80 to 100° F.
Time—30 to 90 seconds
Agitation of the bath effected by the evolution of gases Each conditioning and plating step was followed by one or more water rinses.

Adhesion tests similar to those conventionally used for paints and varnishes were used. First, a razor blade was used to cut a horizontal line through the electroplate on each disc. A piece of pressure-sensitive, adhesive cellophane tape (Mystik #6450, manufactured by Mystik Tape, Inc., a Division of Borden Chemical Co.) was then pressed onto the surface and pulled off. If the electroplate came loose from the plastic, the adhesion was considered poor. If the plated disc passed this preliminary test, an additional test for adhesion was performed. This additional adhesion test consisted of cutting through the plate with eleven No. 16 Exacto knife blades bolted together in a parallel fashion so that the distance from the first to the eleventh blade was about ¾₁₆″. Right angle cuts were made with the eleven knife blades so that the plating was cut into 100 squares in a surface area approximately ¾₁₆″ by ¾₁₆″, or in other words, each square had a side approximately $1.875 \times 10^{-2}$ inch. This cutting action imposed considerable stresses into the small squares. A pressure sensitive cellophane adhesive tape, like that used above, was then pressed firmly over the 100 squares and jerked off. If none of the squares of plating were removed from the disc when the tape was so removed, the adhesion was rated good. If more than ten squares were removed, the adhesion was rated poor.

The results from the above tests for the various styrene/butadiene block copolymer samples are presented in Table I.

TABLE I

| Sample No. | Adhesion Rating | Styrene/Butadiene Ratio |
|---|---|---|
| 1 (control) | Very poor | 100/0 |
| 2 | Poor | 98/2 |
| 3 | Good | 95/5 |
| 4 | do | 90/10 |
| 5 | do | 80/20 |
| 6 | do | 75/25 |

From these test data it can be seen that the presence of a conjugated diene (butadiene) is necessary to lend platability to a monovinyl-substituted aromatic compound (styrene), by a conventional metal-plating technique, and that the bond strength between the metal plate and the polymer is good when the conjugated diene portion of the block copolymer is greater than 2 weight percent.

EXAMPLE II

A series of tests was made to determine the effect of adding styrene/butadiene block copolymers on electroplatability of low acrylonitrile content styrene/acrylonitrile copolymers. A styrene/acrylonitrile resin containing 5.68 weight percent acrylonitrile was blended with a rubbery 75/25 butadiene/styrene block copolymer and a resinous 75/25 styrene/butadiene block copolymer and bis($\alpha,\alpha$ - dimethylbenzyl)peroxide and the mixture was heated. The blending was conducted in an internal mixer, Brabender Plastograph. The chamber of the mixer was flushed with nitrogen, the styrene/acrylonitrile resin and the resinous 75/25 styrene/butadiene block copolymers were introduced and mixed at a slow speed until fluxing occurred. The rubbery 75/25 butadiene/styrene block copolymer was added and the materials were mixed for three minutes under a nitrogen blanket with the mixer operating at 100 r.p.m. The peroxide was then added, the vacuum head closed and the chamber evacuated. Mixing was continued at 100 r.p.m. for seven minutes. The initial mixing temperature, after addition of the peroxide, for the composition was 325° F. and the final temperature was 370° F. Various amounts of the styrene/acrylonitrile resin, 75/25 styrene/butadiene block copolymer, and 75/25 butadiene/styrene block copolymer were used during the test. The blends were removed from the mixer and fabricated into strips 4 inches x 1 inch x ⅟₁₆ inch. Each strip was electroplated and an adhesive test made on the plated strip in accordance with the procedure of Example I.

The following recipe was employed for the preparation of the styrene/acrylontirile resin:

| | Parts by weight |
|---|---|
| Styrene | 95 |
| Acrylontrile | 5 |
| Water | 210 |
| Santomerse 85[1] | 2 |
| Sodium bisulfite | 0.01 |
| Potassium persulfate | 0.3 |
| Temperature, ° C. | 50 |
| Conversion, percent | 100 |
| Shortstop: Thiostop N[2] | 0.15 |

[1] An alkyl aryl sulfonate.
[2] Sodium dimethyldithiocarbamate.

The rubbery 75/25 butadiene/styrene block copolymer was prepared in n-hexane diluent using 2.6 gram millimoles of n-butyllithium per 100 grams of monomer as initiator. All the ingredients were charged initially to a reactor. Polymerization was initiated at about 150° F. and the temperature increased to about 220° F. during the reaction. On completion of the polymerization, 1 part by weight per 100 parts rubber from a mixture of $C_{16}$ to $C_{18}$ saturated and unsaturated fatty acids was added to inactivate the catalyst and 1 part by weight per 100 parts rubber of 2,6 - di - tert - butyl-4-methylphenol was added as an antioxidant. The mixture was steam stripped and a wet rubber crumb was washed and dried. The copolymer had a Mooney value (ML-4 @ 200° F.) of about 47.

The resinous 75/25 styrene/butadiene block copolymer was prepared using the following recipe:

| | |
|---|---|
| 1,3-butadiene, parts by weight | 25 |
| Styrene, parts by weight | 75 |
| Cyclohexane, parts by weight | 1000 |
| n-Butyllithium, mhm[1] | 0.08 |
| Temperature, ° F., initiation | 180 |
| Temperature, ° F., peak | 220 |
| Conversion, percent | 100 |

[1] mhm=gram millimoles per 100 grams of monomers.

All recipe ingredients were charged initially to a reactor. The polymerization was conducted in an atmosphere of nitrogen. Upon completion of the polymerization, 1 part by weight per 100 parts by weight copolymer of a mixture of $C_{16}$ to $C_{18}$ saturated and unsaturated fatty acids was added to inactivate the catalyst and a mixture of 1 part by weight per 100 parts copolymer of a phosphinated polyalkyl polyphenol and a 0.1 part by weight of a dilaurylthiodipropionate was added as an antioxidant. The mixture was steam stripped to recover the product.

The composition of the various test samples and the adhesion test results are presented in Table II.

TABLE II

| Sample No. | 1 | 2 | 3 | 4 |
|---|---|---|---|---|
| Styrene/acrylonitrile resin, parts by weight [1] | 90 | 85 | 71.6 | 100 |
| 75/25 styrene/butadiene block copolymer (resin), parts by weight [1] | 2 | 3 | 5 | 0 |
| 75/25 butadiene/styrene block copolymer (rubber), parts by weight [1] | 8 | 12 | 23.4 | 0 |
| Bis (α,α-dimethylbenzyl) peroxide, weight percent [2] | 0.075 | 0.075 | 0.075 | 0.075 |
| Conjugated diene contributed, parts by weight: [1] | | | | |
|   Resinous block copolymer | 0.5 | 0.75 | 1.25 | 0 |
|   Rubbery block copolymer | 6.0 | 9.00 | 17.75 | 0 |
|   Total | 6.5 | 9.75 | 19.00 | 0 |
| Adhesion rating [3] | ([4]) | ([4]) | ([4]) | ([5]) |

[1] [2] Parts by weight and weight percent based upon total weight of polymers in compositions.
[3] Same test procedures as Example I.
[4] Good.
[5] Very poor.

From these data it can be seen that the addition of styrene/butadiene block copolymers impart platability to a styrene/acrylonitrile resin with a low acrylonitrile content which otherwise has very poor platability.

EXAMPLE III

A series of tests was made to determine the effect of adding a 75/25 butadiene/styrene rubbery block copolymer prepared in accordance with the procedure in Example II to a general purpose polystyrene ("COSDEN" 550, manufactured by Cosden Oil and Chemical Co.). Control runs were made using a general purpose polystyrene manufactured by Shell Chemical Co. and two styrene/butadiene resinous random copolymers. The compositions were molded into strips and electroplated and subjected to adhesion tests. The composition of the various test samples and the adhesion test results are presented in Table III.

From these data it can be seen that the addition of a styrene/butadiene block copolymer having a conjugated diene portion of at least 1.5 weight percent, based on the total weight of the composition, lends electroplatability to otherwise difficult-to-plate polystyrene. In addition, these data show that the styrene/butadiene copolymer must be a block copolymer to obtain good adhesion.

As will be readily recognized the polymeric materials of this invention can be economically produced by conventional polymerizational processes. The metal-plated polymeric compositions can be used for many applications where plated ABS is presently used and are considerably less expensive to produce.

As will be evident to those skilled in the art, many variations and modifications can be practiced within the scope and spirit of this invention and it should be understood that the latter is not necessarily limited to the aforementioned discussion.

We claim:

1. A composition comprising (A) from 1.6 to 100 weight percent, based on the total weight of the composition, of at least one block copolymer formed from at least one monovinyl-substituted aromatic compound and at least one conjugated diene, the conjugated diene portion of said block copolymer being in the range of 1.5 to 50 weight percent, based on the total weight of the composition, and (B) from 0 to 98.4 weight percent, based on the total weight of the composition, polystyrene, a styrene-acrylonitrile copolymer containing less than 8 weight percent acrylonitrile based on the total weight of the acrylonitrile-containing copolymer, and mixtures thereof, having an electrolessly plated metal layer and an electrodeposited metallic layer thereon.

2. The article according to claim 1 wherein said composition comprises 100 weight percent, based on the total weight of the composition of at least one block copolymer formed from at least one monovinyl-substituted aromatic compound and at least one conjugated diene with the conjugated diene portion of the composition being in the range of 3 to 30 weight percent.

3. The article according to claim 2 wherein said monovinyl-substituted aromatic compound is styrene and said conjugated diene is butadiene.

TABLE III

| | 1 | 2 | 3 | 4 | 5 | 6 | 7 |
|---|---|---|---|---|---|---|---|
| Polystyrene type | Cosden 550 | Cosden 550 | Cosden 550 | Cosden 550 | Shell | | |
| Polystyrene, parts by weight [1] | 90 | 85 | 75 | 98 | 100 | | |
| 75/25 butadiene/styrene block copolymer (rubber), parts by weight [1] | 10 | 15 | 25 | 2 | | | |
| 95/5 styrene/butadiene random copolymer (resin), parts by weight [1] | | | | | | 100 | |
| 98/2 styrene/butadiene random copolymer (resin), parts by weight [1] | | | | | | | 100 |
| Bis(α,α-dimethylbenzyl)peroxide, weight percent [2] | 0.01 | 0.016 | 0.026 | 0.075 | | | |
| Agerite Geltrol [3], weight percent [2] | 1.33 | 1.33 | 1.33 | 0.106 | | | |
| 2,6-di-tert-butyl-4-methylphenol, weight percent [2] | 0.67 | 0.67 | 0.67 | 0.054 | | | |
| Conjugated diene contributed by block or random copolymer, parts by weight [1] | 7.5 | 11.25 | 18.75 | 1.5 | | 5 | 2 |
| Adhesion rating [4] | Good | Good | Good | Good | Poor | Poor | Poor |

[1] [2] Parts by weight and weight percent based upon total weight of polymers composition.
[3] See Table I for description.
[4] Same test procedures as Example I.

References Cited

UNITED STATES PATENTS

| 3,099,608 | 7/1963 | Radovsky et al. | 204—15 |
| 3,212,918 | 10/1965 | Tsu et al. | 117—54 |
| 3,305,460 | 2/1967 | Lacy | 204—20 |
| 3,423,226 | 1/1969 | Jensen | 117—47 |

L. DEWAYNE RUTLEDGE, Primary Examiner

E. L. WEISE, Assistant Examiner

U.S. Cl. X.R.

117—138.8